United States Patent Office 3,202,727
Patented Aug. 24, 1965

3,202,727
PURIFICATION OF BUTADIENE BY OXIDATION TO REMOVE ACETYLENE
Stuart Neil Dancer, Leatherhead, England, assignor to The Distillers Company Limited, Edinburgh, Scotland, a British company
No Drawing. Filed Dec. 20, 1962, Ser. No. 245,966
Claims priority, application Great Britain, Jan. 9, 1962, 763/62
7 Claims. (Cl. 260—681.5)

The present invention relates to the removal by selective oxidation of acetylene from admixture with gaseous hydrocarbons and in particular from mixtures containing butadiene. The product gas stream obtained by the vapour phase catalytic oxidation of butenes to form butadiene over catalysts such as tin/antimony oxides, bismuth tungstate, bismuth molybdate, etc. is a typical gas stream which may be treated by the process of the present invention. Such a gas stream contains in addition to butadiene, unreacted butenes, water, oxygen, nitrogen, carbon dioxide, carbon monoxide and traces of acetylene. The presence of acetylene in the product is most undesirable causing difficulties in the subsequent separation of butadiene from unreacted butenes and being an unacceptable impurity in the final product.

It has now been found that by selective oxidation in the presence of a copper-containing catalyst it is possible to remove the acetylene from such gaseous mixtures without loss of butadiene by oxidation.

According to the present invention a process for the removal, by selective oxidation, of acetylene from a gas stream containing it together with butadiene comprises passing the gas stream in admixture with sufficient oxygen over a heated copper-containing catalyst. The gas stream to be treated in accordance with the invention may contain, in addition to acetylene and butadiene, other gaseous hydrocarbons, e.g. butanes and butenes.

The copper catalyst employed in the process may comprise copper oxide deposited if desired upon any suitable support material e.g. alumina.

The temperature at which the selective oxidation of the acetylene is effected may vary between moderately wide limits for example between 120° C. and 275° C.

In a preferred embodiment of the invention the oxygen usually present in the gas stream is employed for the selective oxidation of the acetylene without further addition of fresh oxygen. It has been found in practice that this oxygen is usually just sufficient for oxidising the acetylene and that the resulting gas stream is not only free from acetylene but also contains only minor traces of oxygen. The addition of fresh molecular oxygen for the purpose of oxidising the acetylene is however envisaged and intended within the scope of the present invention.

The invention will be illustrated further by reference to the following examples.

*Example 1*

A gas stream consisting substantially of butenes and butadiene together with 0.3% v./v. oxygen and 0.1% v./v. acetylene was passed at 230° C. over a catalyst prepared by pelleting an intimate mixture of 175 g. of powdered alumina and 110 g. of copper oxide. The contact time was 4.25 seconds. No acetylene could be detected in the resulting gas stream and the oxygen content had been reduced to 200 p.p.m.

*Example 2*

A catalyst was prepared by soaking alumina chips in a saturated aqueous solution of copper nitrate at 80° for 2 hours followed by drying and heating in air at 500° for 8 hours. The acetylene was completely removed by this catalyst at 150° C. from a $C_4$ gas stream, containing ca. 55% v./v. butadiene, 0.3% v./v. oxygen and 0.1% v./v. acetylene. A contact time of 4.25 seconds was used.

I claim:
1. A process which comprises passing a gas stream containing butadiene, acetylene, and sufficient oxygen to oxidize the acetylene at a temperature between 120° and 275° C. over a solid copper-containing catalyst comprising copper oxide and selectively oxidizing the acetylene to remove it from the gas stream.
2. A process as claimed in claim 1 wherein fresh oxygen is added to the gas stream for the selective oxidation of the acetylene.
3. A process as claimed in claim 1 wherein the copper oxide is deposited on a support material.
4. A process as claimed in claim 3 wherein the support is alumina.
5. A process as claimed in claim 1 wherein the gas stream contains other gaseous hydrocarbons in addition to butadiene and acetylene.
6. A process as claimed in claim 5 wherein the gas stream is obtained by the vapour phase catalytic oxidation of butenes to form butadiene.
7. A process is claimed in claim 6 wherein the gas stream contains residual oxygen from the catalytic oxidation of butenes to form butadiene in sufficient quantity to avoid the addition of fresh oxygen for the selective oxidation of acetylene.

References Cited by the Examiner
UNITED STATES PATENTS
3,068,304  12/62  Spector _____ 260—681.5

ALPHONSO D. SULLIVAN, *Primary Examiner.*